United States Patent [19]
Tanimoto et al.

[11] Patent Number: 5,732,254
[45] Date of Patent: Mar. 24, 1998

[54] PIPELINE SYSTEM BRANCH HISTORY TABLE STORING BRANCH INSTRUCTION ADDRESSES AND TARGET ADDRESSES WITH INHIBIT BITS

[75] Inventors: Kyoko Tanimoto; Aiichiro Inoue, both of Kawasaki, Japan

[73] Assignee: Fujitsu Limited, Kawasaki, Japan

[21] Appl. No.: 783,039

[22] Filed: Jan. 14, 1997

[30] Foreign Application Priority Data

Feb. 9, 1996 [JP] Japan .................... 8-024255

[51] Int. Cl.⁶ .................... G06F 9/49
[52] U.S. Cl. .................... 395/587
[58] Field of Search .................... 364/DIG. 1 MS File, 364/DIG. 2 MS File; 395/381, 383, 412, 580, 586, 587

[56] References Cited

U.S. PATENT DOCUMENTS

| | | | |
|---|---|---|---|
| 4,334,268 | 6/1982 | Boney et al. | 395/581 |
| 5,394,529 | 2/1995 | Brown, III et al. | 395/587 |
| 5,404,467 | 4/1995 | Saba et al. | 395/383 |
| 5,519,841 | 5/1996 | Sager et al. | 395/412 |
| 5,564,118 | 10/1996 | Steely, Jr. et al. | 395/587 |

FOREIGN PATENT DOCUMENTS

| | | |
|---|---|---|
| 59-91551 | 5/1984 | Japan. |
| 6-35700 | 2/1994 | Japan. |
| 7-152562 | 6/1995 | Japan. |

*Primary Examiner*—Robert B. Harrell
*Attorney, Agent, or Firm*—Staas & Halsey

[57] ABSTRACT

In an information processing apparatus, an instruction read inhibit bit is provided for branch instruction address and target instruction address registered in pair in the branch history. When the reading of a target instruction predicted from the pair of addresses is inhibited, the instruction read inhibit bit is set to an ON state. When execution of the predicted target instruction is canceled due to the difference between the predicted target instruction and an actual target instruction and the actual target instruction is read again, an instruction read inhibit bit setting section sets the instruction read inhibit bit of the pair of addresses in the branch history to the ON state. Accordingly, even when the information processing apparatus is of a pipeline processing type and the address of the target instruction is changed every time the identical branch instruction appears, it becomes possible to execute the branch instruction without wasting time and to effectively utilize the branch history, thereby increasing the processing speed of the branch instruction, i.e., improving the information processing performance.

4 Claims, 9 Drawing Sheets

PIPELINE SYSTEM BRANCH HISTORY TABLE STORING BRANCH INSTRUCTION ADDRESSES AND TARGET ADDRESSES WITH INHIBIT BITS

BACKGROUND OF THE INVENTION

(1) Field of Invention

The present invention relates to an information processing apparatus adopting a pipeline processing method and, more particularly, to an information processing apparatus capable of executing branch instructions at high speed using branch history.

(2) Description of the Related Art

In general, an information processing apparatus (i.e., a pipeline processor) which adopts a pipeline processing method improves its performance (increases its processing speed) by introducing a subsequent sequence of instructions into a pipeline in succession, and starting execution of the thus introduced instructions without waiting for the completion of one instruction, when the execution stage becomes empty.

However, if the result of the execution of the preceding instruction affects the execution of the subsequent instruction, it is necessary to wait for the completion of the preceding instruction before starting the execution of the subsequent instruction. As a result of the processor waiting for the completion of execution of the preceding instruction, disturbances arise in the pipeline processing, which results in a decrease in the performance of the information processing apparatus.

A branch instruction is mentioned as a typical example of an instruction which affects the subsequent instructions. The result of a decision as to whether or not the conditions of a branch are satisfied and the address of a target instruction of the branch cannot be obtained before the completion of execution of the branch instruction, which results in disturbances in the pipeline processing.

To prevent such disturbances, a concept of branch history is generally adopted in order to speed up the processing of the branch instruction. For example, assume that it turns out that the conditions of a branch are satisfied as a result of execution of a certain branch instruction while the information processing apparatus is executing operations. In such a case, the address of that branch instruction (hereinafter referred to as a branch instruction address) and the address of a target instruction of the branch (hereinafter referred to as a target instruction address) are registered in pair in a branch history. In this way, the paired data are accumulated in the branch history with respect to each branch instruction which caused a branch.

When a certain branch instruction is fetched from the main storage device and is executed, the branch history is looked up before the execution of that branch instruction. If the address of the branch instruction has been registered in the branch history, a target instruction address paired with that branch instruction address is read from the branch history. An instruction corresponding to the target instruction address is fetched from the main storage device and is executed, without waiting for the completion of execution of the preceding instruction. If the copy of the instruction corresponding to the target instruction address is retained in a cache memory, that instruction is fetched from the cache memory and is executed.

The target instruction address is predicted on the basis of the results of the execution of the past branch instructions accumulated in the branch history before the execution of the branch instruction. If it is predicted that the branch is taken (that is, if the target instruction address corresponding to the branch instruction address is registered in the branch history), instruction fetch (which is synonymous with the reading of an instruction; a reading operation will be often referred to as a fetching operation hereinafter) is carried out using the predicted target instruction address. The target instruction which was read after the branch instruction is introduced into the instruction execution stage.

In this way, when a branch instruction is executed, a subsequent instruction or a target instruction is executed before it turns out whether or not branch conditions of the branch instruction are satisfied, thereby speeding up the processing of the branch instruction.

In many cases, an instruction sequence is executed using a subroutine. Think that a subroutine is executed after having been called from the main routine, and that the processing then returns from the subroutine to the main routine. In short, think of the execution of the branch instruction. Particularly, when the processing returns from the subroutine to the main routine, the target instruction address is changed every time the processing branches from the subroutine returns to the main routine.

With reference to, e.g., FIG. 9, the change of the target instruction address will be described. After a branch has taken place from an instruction 2a (a branch instruction) of the main routine to an instruction 1d of the subroutine, another branch takes place from an instruction 4d (a branch instruction) of the subroutine to an instruction 3a of the main routine. Further, after a branch has taken place from an instruction 2b (a branch instruction) of the main routine to an instruction 1d of the subroutine, another branch takes place from the instruction 4d (the branch instruction) of the subroutine to an instruction 3b of the main routine. Then, after a branch has taken place from an instruction 3c (a branch instruction) of the main routine to the instruction 1d of the subroutine, another branch takes place from the instruction 4d (the branch instruction) of the subroutine to an instruction 4c of the main routine. In the above described case, the branch target of the instruction 4d of the subroutine changes among the instructions 3a, 3b, and 4c of the main routine in this order, every time the branch takes place.

As described above, a branch has previously been performed in accordance with a branch instruction, and the branch instruction address and target instruction address are registered in pair in the current branch history. When a subsequent branch instruction is fetched from the main storage device (or the cache memory) in order to execute the branch instruction, instruction fetch is carried out using the target instruction address obtained as a result of look up of the branch history before the branch instruction is executed. However, if the target instruction address is changed for any reasons, the target instruction address obtained as a result of the look up of the branch history becomes eventually invalid. In consequence, the request currently being executed is canceled, and the instruction fetch is executed again using a correct target instruction address. In this case, the branch instruction address and the target instruction address which were actually executed are registered in pair in the branch history again.

If the above-described operations are repetitively carried out, the target instruction address is changed during the course of the execution of the identical branch instruction. As a result, if the instruction fetch is executed using the target instruction address obtained as a result of look up of the branch history, that target instruction address becomes invalid. The request currently being executed is canceled, and it becomes necessary to carry out the instruction fetch using a correct target instruction address again.

Figure 9:
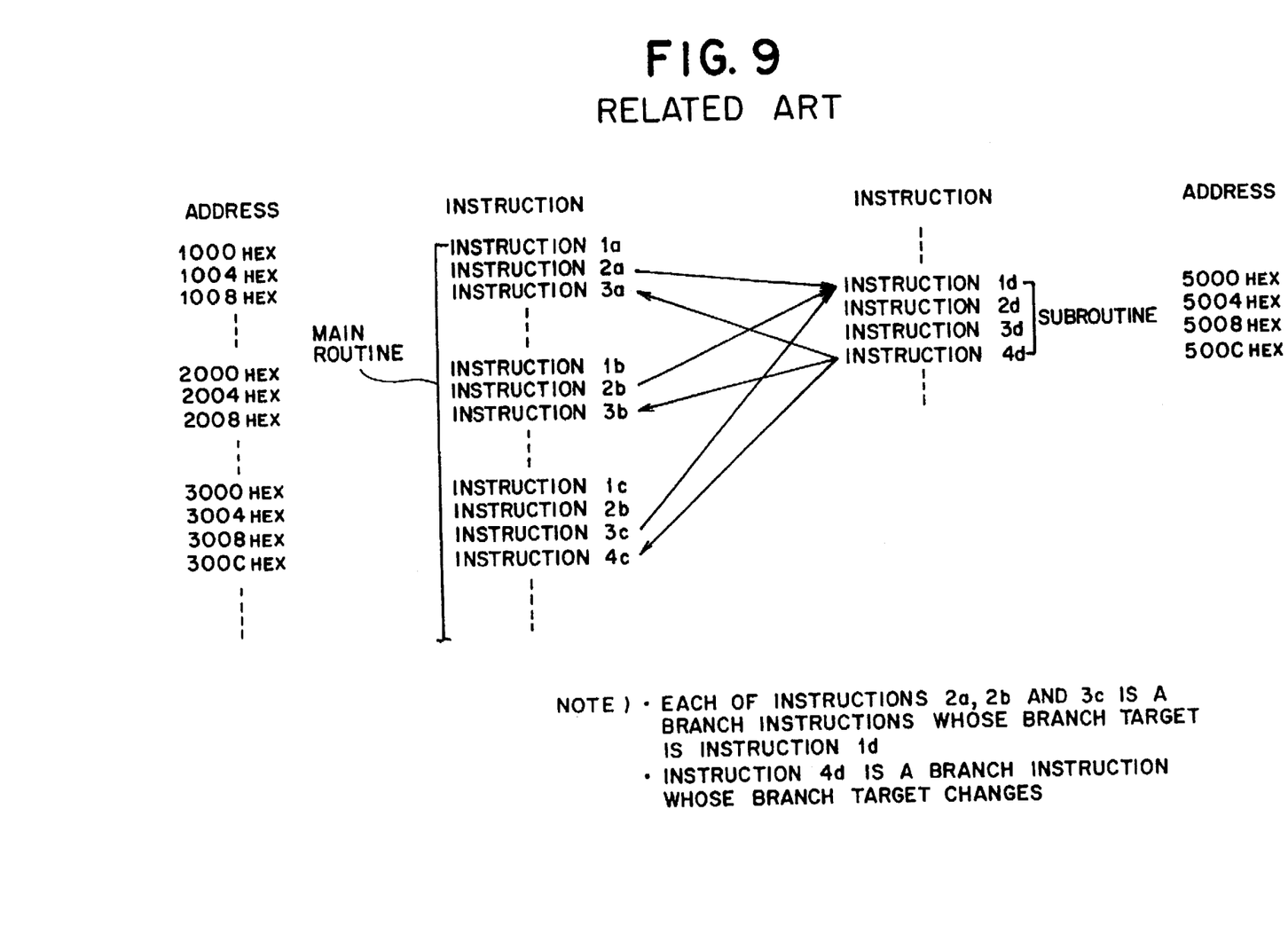
FIG. 9 is a diagrammatic representation showing an example of an instruction sequence in which the address of a target instruction is changed every time the same branch instruction appears.
Figure 10:
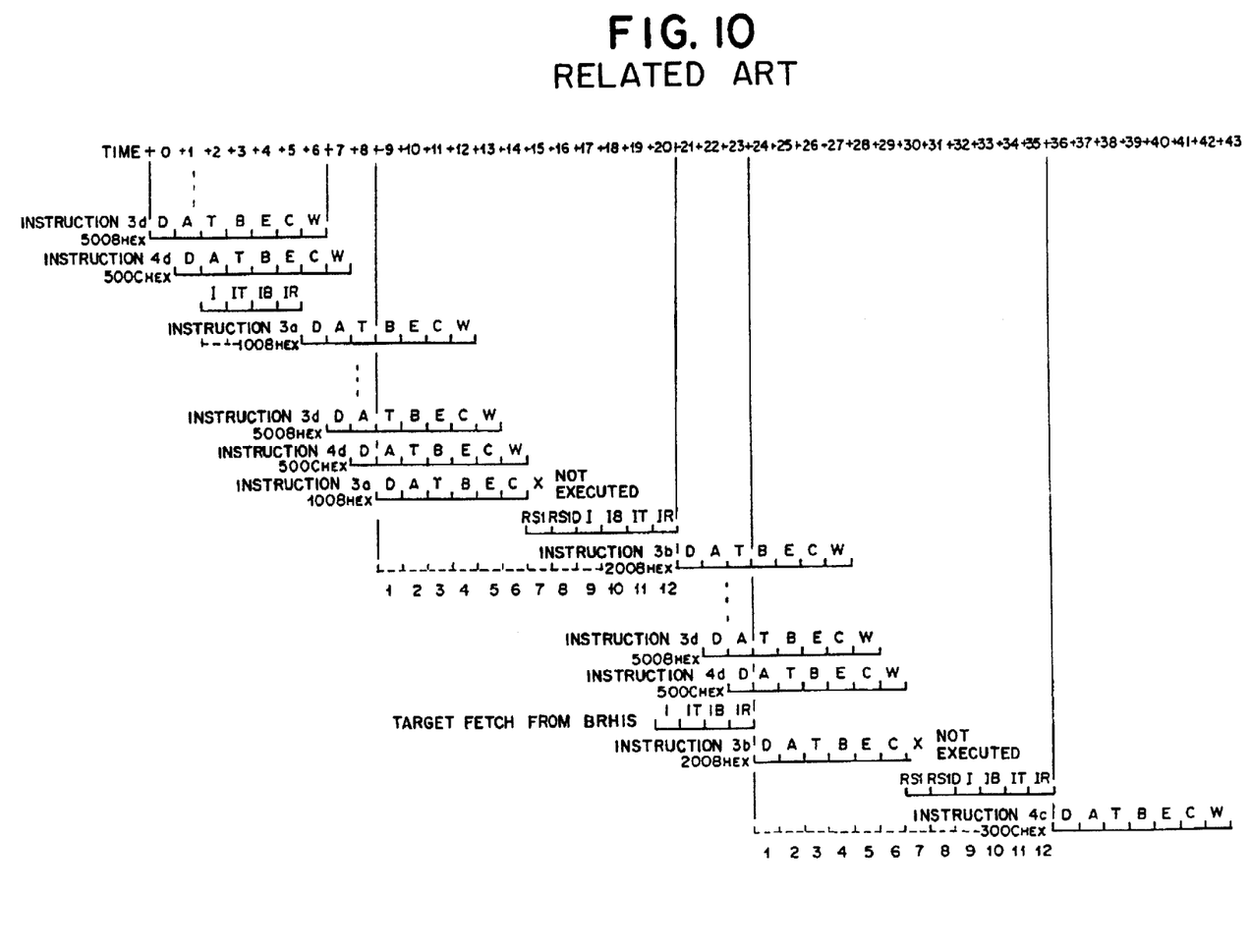
FIG. 10 is a timing chart for illustrating general pipeline processing in which instructions shown in FIG. 9 are executed using a branch history.

With regard to the previously described example shown in FIG. 9, FIG. 10 shows specific pipeline processing operations (i.e., a timing chart) which are executed using the branch history. As illustrated in FIG. 10, an instruction fetch pipeline comprises four cycles (i.e., I, IT, IB, and IR), and an instruction execution pipeline (i.e., the main pipeline) comprises seven cycles (i.e., D, A, T, B, E, C, and W).

In the instruction fetch pipeline, I denotes a cycle for calculating an instruction fetch address, IT denotes an address conversion cycle. IB denotes a cycle for reading an instruction from a buffer (the cache memory or the main storage device), and IR denotes a cycle for introducing an instruction into the instruction execution pipeline).

In the instruction execution pipeline, D denotes a cycle for decoding the instruction, A denotes a cycle for calculating the address of an operand of the main storage device, and T denotes an address conversion cycle. B denotes a cycle for reading the operand from the buffer (the cache memory or the main storage device), E denotes a cycle for performing an operation on the basis of the operand, C denotes a check cycle, and W denotes a cycle for storing the result of the operation.

In FIG. 10, RS1 and RS1D cycles provided at the leading end of the instruction fetch pipeline are reset processing cycles which are executed by a clearing pipeline when a target instruction predicted using the branch history has proved wrong and the execution of that target instruction is canceled halfway. In some cases, the "cycle" will be referred to as a "stage".

When a branch from the instruction 4d of the subroutine to the instruction 3a of the main routine is first performed, the instruction (the branch instruction) 4d first appears in the instruction sequence. Therefore, the address of the instruction 4d ($500C_{HEX}$) and the address of the target instruction 3a ($1008_{HEX}$) are registered in pair in the branch history.

When the instruction 4d appears in the instruction sequence next time, the address of the instruction 3a ($1008_{HEX}$) is obtained by retrieving the branch history, and the address of the target instruction is fetched from the branch history (BRHIS). As a result, it should be possible to introduce the instruction 3a to the instruction fetch pipeline without loss of time.

In practice, a target instruction to which the processing must be branched in accordance with the second execution of the instruction 4d is the instruction 3b, and it will turn out that the instruction 3a is wrong only after the processing has reached the cycle C. The execution of the instruction 3a is canceled halfway, and the instruction fetch is carried out again using the address of the correct instruction 3b ($2008_{HEX}$). As a result, a loss of 12τ (1τ is a processing time of one cycle) is produced between the execution of the instruction 4d and the execution of the instruction 3b.

In this event, the address of the instruction 4d ($500C_{HEX}$) and the address of the target instruction 3b ($2008_{HEX}$) are registered in pair in the branch history. When the instruction 4d appears in the instruction sequence next time, the address of the instruction 3b ($2008_{HEX}$) is obtained by retrieving the branch history, whereby the address of the target instruction is fetched from the branch history (BRHIS).

In practice, a target instruction to which the processing must be branched in accordance with the execution of the instruction 4d is the instruction 4c, and it will turn out that the instruction 3b is wrong only after the processing has reached the cycle C. The execution of the instruction 3b is canceled halfway, and the instruction fetch is carried out again using the address of the correct instruction 4c ($300C_{HEX}$). Even in this case, a loss of 12τ is resultantly produced between the execution of the instruction 4d and the execution of the instruction 4c.

According to the original function of the branch history, if the branch instruction is registered in the branch history after a branch has been caused by a branch instruction, and if branch conditions are satisfied when the identical branch instruction appears in the instruction sequence next time, that branch instruction is registered in the branch history. Therefore, it is possible to predict and execute a subsequent instruction or a target instruction before a decision as to whether or not the branch conditions are satisfied, which makes it possible to execute the branch instruction without loss.

However, when the address of the target instruction changes every time the branch instruction appears, as shown in FIG. 9, and instruction fetch is performed using the target instruction address that is obtained as a result of look up of the branch history, the address of the target instruction becomes invalid, as shown in FIG. 10. For this reason, processing for cancellation is performed by the clear pipeline, and an instruction must be fetched again using a correct address through processing by the instruction fetch pipeline.

The information regarding the identical branch instruction registered in the branch history always comprises a pair of information, that is, a newest target instruction address and the address of a corresponding branch instruction. When a branch is executed again using the first branch instruction address and the corresponding target instruction address, the information about these addresses has already been lost. Consequently, the time required to retrieve that information from the branch history adds to the loss time to a much greater extent. This makes it impossible to effectively utilize the branch history.

SUMMARY OF THE INVENTION

The present invention has been conceived in view of the above-described drawbacks, and an object of the present invention is to provide an information processing apparatus which can execute branch instructions without wasting time and can efficiently utilize a branch history, even if the address of a target instruction is changed every time the same branch instruction appears, thereby increasing the processing speed of a branch instruction, i.e., improving the information processing performance.

To this end, the information processing apparatus of the present invention is provided with a branch history in which the address of a branch instruction and the address of a target instruction at the time when branching conditions of the branch instruction are satisfied are registered in pair. The branch history is retrieved on the basis of the address of the branch instruction prior to execution of the branch instruction. If the address of the target instruction which pairs off with the address of the current target instruction is registered in the branch history, an instruction corresponding to the address of the target instruction is read as a predicted target instruction, and this predicted target instruction is introduced into an instruction execution pipeline. In the information processing apparatus based on a pipeline processing method, an instruction read inhibit bit is provided for each pair of addresses registered in the branch history. The instruction read inhibit bit is set to an ON state when the reading of the predicted target instruction based on the pair of addresses is inhibited. To execute the branch instruction, the predicted target instruction is read according to the pair of addresses already registered in the branch history, and the thus read target instruction is executed. In this case, if the execution of the predicted target instruction is canceled because of the difference between the predicted target instruction and the actual target instruction, and the actual target instruction is read again. To cope with such a situation, the information processing apparatus is provided with instruction read inhibit bit setting means which sets the instruction read inhibit bits of the pair of addresses in the branch history to the ON state.

If the predicted target instruction cannot be executed for the difference between the predicted target instruction and the actual target instruction, it is necessary to read the actual target instruction again. According to the information processing apparatus of the present invention, such a necessity is set and registered in the instruction read inhibit bits of the branch history. Therefore, if the address of the target instruction is changed every time the identical branch instruction appears, the branch instruction can be executed without wasting time. As a result, it is possible to effectively utilize the branch history, which in turn speeds up the processing of the branch instruction to a much greater extent. Further, the information processing performance of the information processing apparatus can be significantly improved.

DESCRIPTION OF THE PREFERRED EMBODIMENTS (a) Aspect of the Invention

An aspect of the present invention will first be described with reference to the accompanying drawings.

Figure 1:
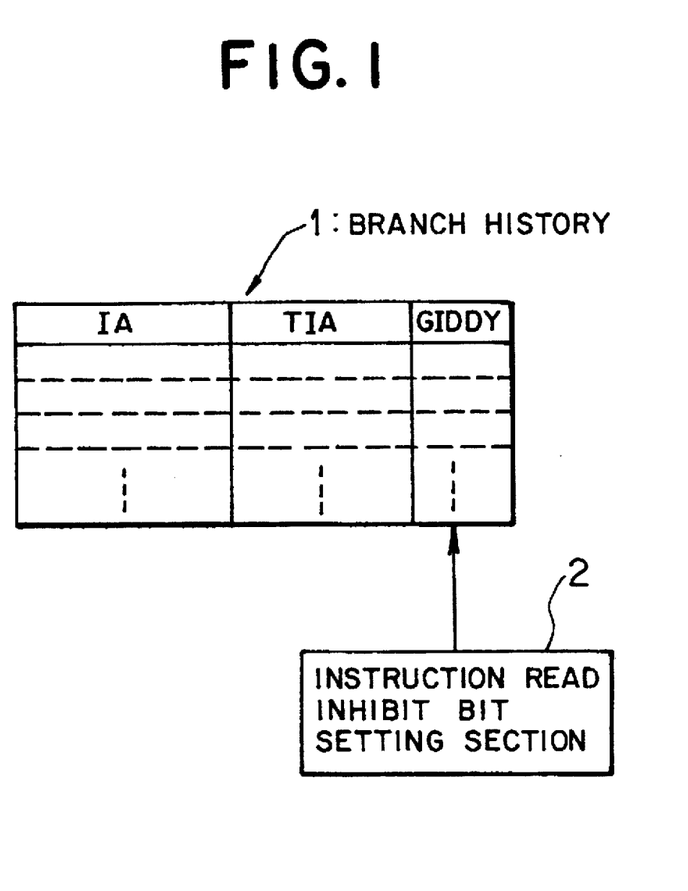
FIG. 1 is a block diagram showing an aspect of the present invention.

FIG. 1 is a block diagram showing an aspect of the present invention. As shown in FIG. 1, the information processing apparatus of the present invention is provided with a branch history 1. In this branch history 1, an address IA (Instruction Address) of a branch instruction and an address TIA (Target Instruction Address) of a target instruction, which is obtained when branch conditions of the branch instruction are satisfied, are registered in pair.

The information processing apparatus of the present invention adopts a pipeline processing method. In this information processing apparatus, the branch history 1 is looked up on the basis of the address IA of the branch instruction prior to the execution of the branch instruction. If the address TIA of a target instruction which pairs off with the address IA is registered in the branch history, the instruction corresponding to the address TIA is read as the predicted target instruction. The thus read target instruction is introduced into an instruction execution pipeline.

In the information processing apparatus of the present invention, instruction read inhibit bit GIDDY is provided for each pair of addressees IA and TIA registered in the branch history 1. When the reading of a target instruction predicted from the pair of addresses IA and TIA is inhibited, the instruction read inhibit bit GIDDY is set to an ON state. The information processing apparatus of the present invention is further provided with an instruction read inhibit bit setting section 2, which will be described below.

When a predicted target instruction is read according to the pair of addressees IA and TIA already registered in the branch history 1 in order to execute the branch instruction, the execution of the predicted target instruction is canceled for the difference between the predicted target instruction and the actual target instruction, and the actual target instruction is read again. In such a situation, the instruction read inhibit bit setting section 2 sets the instruction read inhibit bit GIDDY of the pair of addresses IA and TIA in the branch history 1 to the ON state.

As a result, in the previously described information processing apparatus of the present invention, if branch conditions of a branch instruction are satisfied when the branch instruction is executed, the pair of address IA of the branch instruction and address TIA of the target instruction are registered in pair in the branch history 1 in the same manner as in the conventional information processing apparatus.

When the branch history 1 is retrieved when the branch instruction is executed and the address TIA of the target instruction corresponding to the address IA of the branch instruction is already registered in the branch history (i.e., if the address TIA is hit), a target instruction located at the address TIA is read and executed as the predicted target instruction.

However, if there is a difference between the predicted target instruction and the actual target instruction because of a change in the address of the target instruction, it is necessary to read the actual target instruction. In such a case, in the information processing apparatus of the present invention, the instruction read inhibit setting section 2 sets the instruction read inhibit bit GIDDY of the corresponding pair of addresses IA and TIA to the ON state, whereby the information about the necessity of reading the actual target instruction is registered in the branch history 1.

The information processing apparatus of the present invention may be provided with an instruction read inhibit section or a hold section, which will be described later.

When the instruction read inhibit bit GIDDY of the registered pair of addressees IA and TIA, which is obtained as a result of retrieval of the branch history 1, is in the ON state, the instruction read inhibit section inhibits the reading of the predicted target instruction obtained from the pair of addresses IA and TIA.

As a result, in the previously described information processing apparatus of the present invention, if an address TIA is hit as a result of the retrieval of the branch history 1 prior to the execution of a branch instruction, the instruction read inhibit bit GIDDY corresponding to the pair of addresses IA and TIA is read. If the thus read instruction read inhibit bit GIDDY is in the ON state, the instruction read inhibit section inhibits the reading of an instruction located at the address TIA as the predicted target instruction. Then, an instruction is read using an address of the correct target instruction according to ordinary procedures without use of the branch history 1. In other words, the instruction is read using the address of a correct target instruction generated from the operand address. Therefore, even if the address of the target instruction is changed every time the same branch instruction appears, it becomes possible to execute the branch instruction without wasting time.

If the instruction read inhibit bit GIDDY of the registered pair of addresses IA and TIA, which is obtained as a result of retrieval of the branch history 1 when the branch instruction is executed, is in the ON state, the hold section retains the registered pair of addresses IA and TIA just as they are.

As a result, in the information processing apparatus of the present invention, if the instruction read inhibit bit GIDDY, which is read on the basis of the hit addresses IA and TIA resulting from the retrieval of the branch history 1 prior to the execution of the branch history, is in the ON state, the hold section retains the pair of addresses IA and TIA just as they are. As a result, the registration of the address of the branch instruction and the address of a new target instruction into the branch history is prevented.

When the branch history 1 is retrieved again after switching the instruction read inhibit bit GIDDY from the ON state to an OFF state, the information (i.e., the pair of addresses IA and TIA) which is registered in the branch history at the time when the instruction read inhibit bit GIDDY is set to the ON state, becomes available. Therefore, even if the address of the target instruction is changed every time the identical branch instruction appears, it becomes possible to effectively utilize the branch history 1 to a much greater extent.

If the predicted target instruction cannot be executed for the difference between the predicted target instruction and the actual target instruction, it is necessary to read the actual target instruction again. In such a situation, according to the information processing apparatus of the present invention, such information is set and registered in the instruction read inhibit bits of the branch history 1. Therefore, even if the address of the target branch instruction is changed every time the identical branch instruction appears, it becomes possible to execute the branch instruction without wasting time. Further, it becomes possible to effectively utilize the branch history 1, which in turn results in much faster processing of the branch instruction and considerably improved information processing performance.

(b) Embodiment of the Invention

With reference to the accompanying drawings, one embodiment of the present invention will be described.

Figure 2:
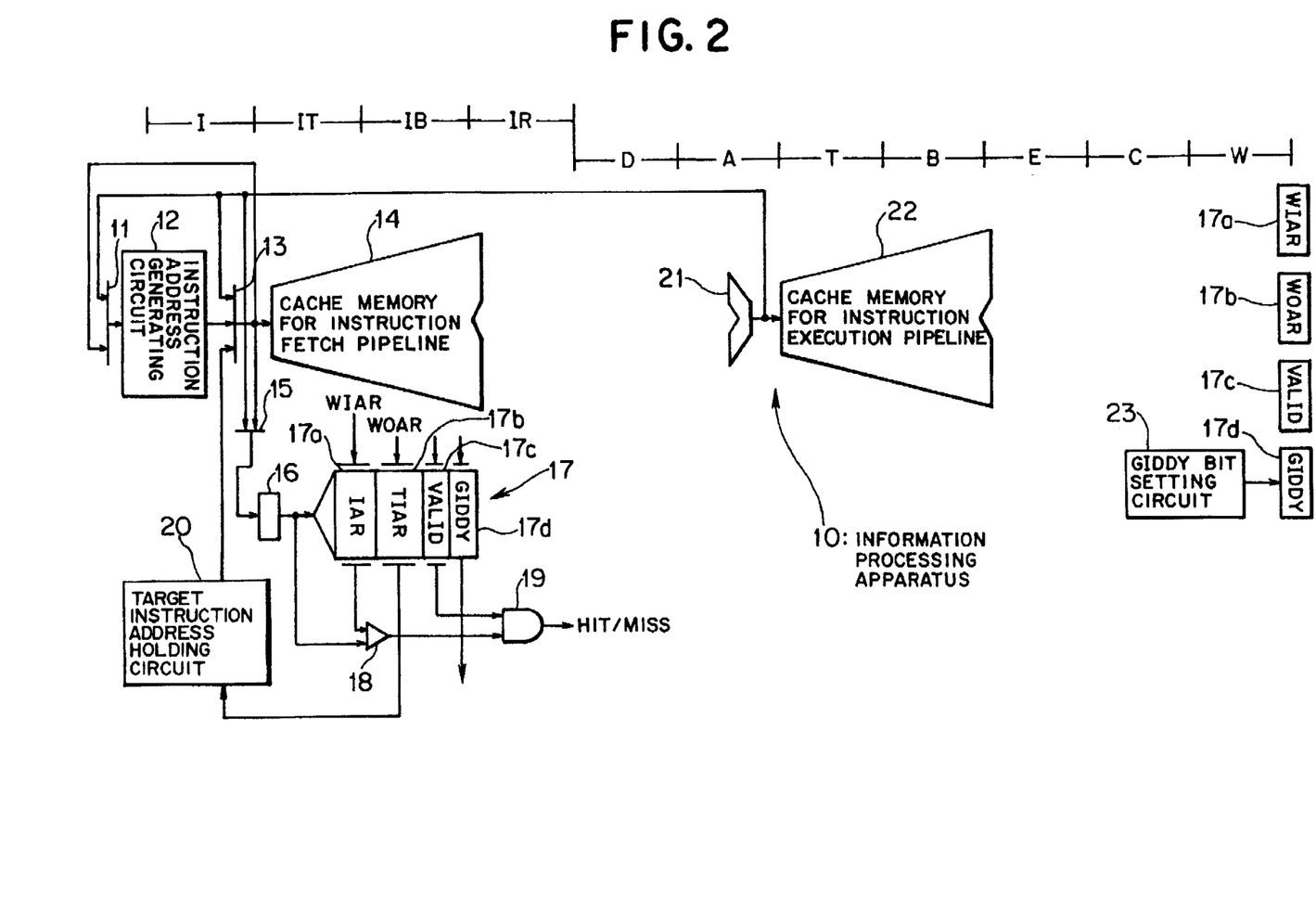
FIG. 2 is a block diagram showing the configuration of an information processing apparatus according to one embodiment of the present invention.

FIG. 2 is a block diagram showing the configuration of an information processing apparatus according to one embodiment of the present invention. As shown in FIG. 2, the information processing apparatus (a pipeline processor) 10 of the present embodiment, which adopts a pipeline processing method, comprises an instruction fetch pipeline processing system including four cycles, i.e., the previously described I, IT, IB and IR cycles, and an instruction execution pipeline (i.e., the main pipeline) including seven cycles, i.e., D, A, T, B, E, C, and W cycles.

The instruction fetch pipeline processing system comprises a selecting circuit 11, an instruction address Generating circuit 12, a selecting circuit 13, a cache memory 14 for use with the instruction fetch pipeline, a selecting circuit 15, an address register 16 for use with a branch history, a branch history 17, a comparator 18, an AND gate 19, and a target instruction address hold circuit 20.

The instruction execution pipeline processing system comprises an operand address generating circuit 21, an instruction execution pipeline cache memory 22, and a GIDDY bit setting circuit 23.

Not all of the constituent elements of the information processing apparatus 10 are shown in FIG. 2. Only the elements directly relevant to the present invention are selectively illustrated in the drawing.

First, each of the constituent elements of the instruction execution pipeline processing system will be described.

In the cycle A (the cycle for calculating the address of the main storage operand), the operand address generating circuit 21 generates an operand address (OP_EAG) on the basis of the result of decoding an instruction introduced from the instruction fetch pipeline. The thus generated operand address is output to the instruction execution pipeline cache memory 22 and the selecting circuits 11, 13, and 15 in the subsequent stages.

The instruction execution pipeline looks up the instruction execution pipeline cache memory 22, and the instruction execution pipeline cache memory 22 is connected to the main storage device (not shown). When the operand address is input to the cache memory 22 from the operand address generating circuit 21, an operand corresponding to the operand address is retrieved and output. If it is impossible to retrieve the operand corresponding to the operand address (i.e., if the operand is not hit, in other words, in the case of a miss), the operand corresponding to the operand address is read from the main storage device.

The GIDDY bit setting circuit 23 is a characteristic element of the present invention. If a predicted target instruction is read and executed according to the result of the look up of the branch history 17 in order to execute the branch instruction, the execution of the predicted target instruction is canceled for the difference between the predicted target instruction and the actual target instruction, and the actual target instruction is read again. In such a case, the GIDDY bit setting circuit 23 sets a GIDDY bit 17d (i.e., instruction read inhibit bit) of the addresses obtained as a result of the look up of the branch history 17 to the ON state (i.e., "one" is registered in the GIDDY bit 17d).

Figure 5:
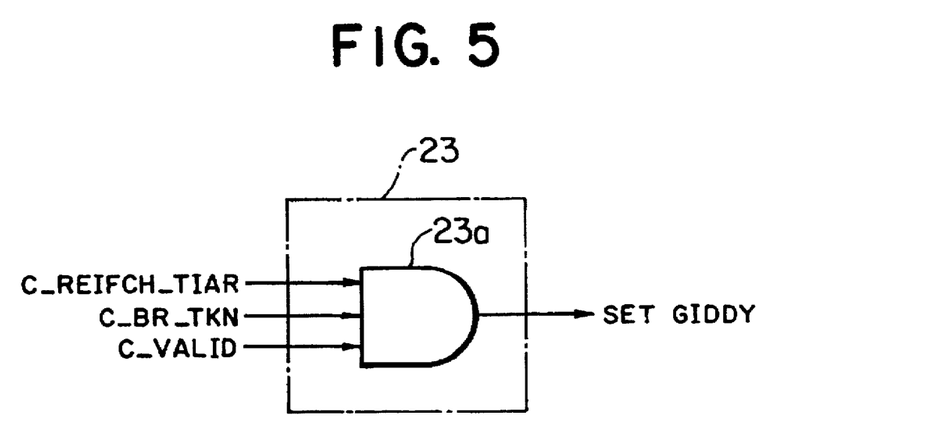
FIG. 5 is a schematic diagram showing the configuration of a GIDDY bit setting circuit according to the present embodiment.

The GIDDY bit setting circuit 23 is composed of the AND gate 23a, as shown in FIG. 5. The AND gate 23a outputs the logical product of three signals, that is, "C_REIFCH_TIAR", "C_BR_TKN", and "C_VALID" obtained in the cycle C (the check cycle).

The signal "C_REIFCH_TIAR" is a signal which becomes "one" when the instruction fetch is executed again because the target address obtained as a result of the retrieval of the branch history 17 is different from the address of the instruction to be actually executed. The signal "C_BR_TKN" is a signal which becomes "one" when the branch instruction executes a branch (i.e., when branch conditions are satisfied). The signal "C_VALID" is a signal which becomes "one" when an instruction of the cycle C is currently executed.

Each of the constituent elements of the instruction fetch pipeline processing system will be described.

The selecting circuit 11 selects either the instruction address selected and output by the selecting circuit 13 or a target branch address OP_EAG generated by the operand address generating circuit 21, and outputs the thus selected address to the instruction address generating circuit 12.

Figure 3:
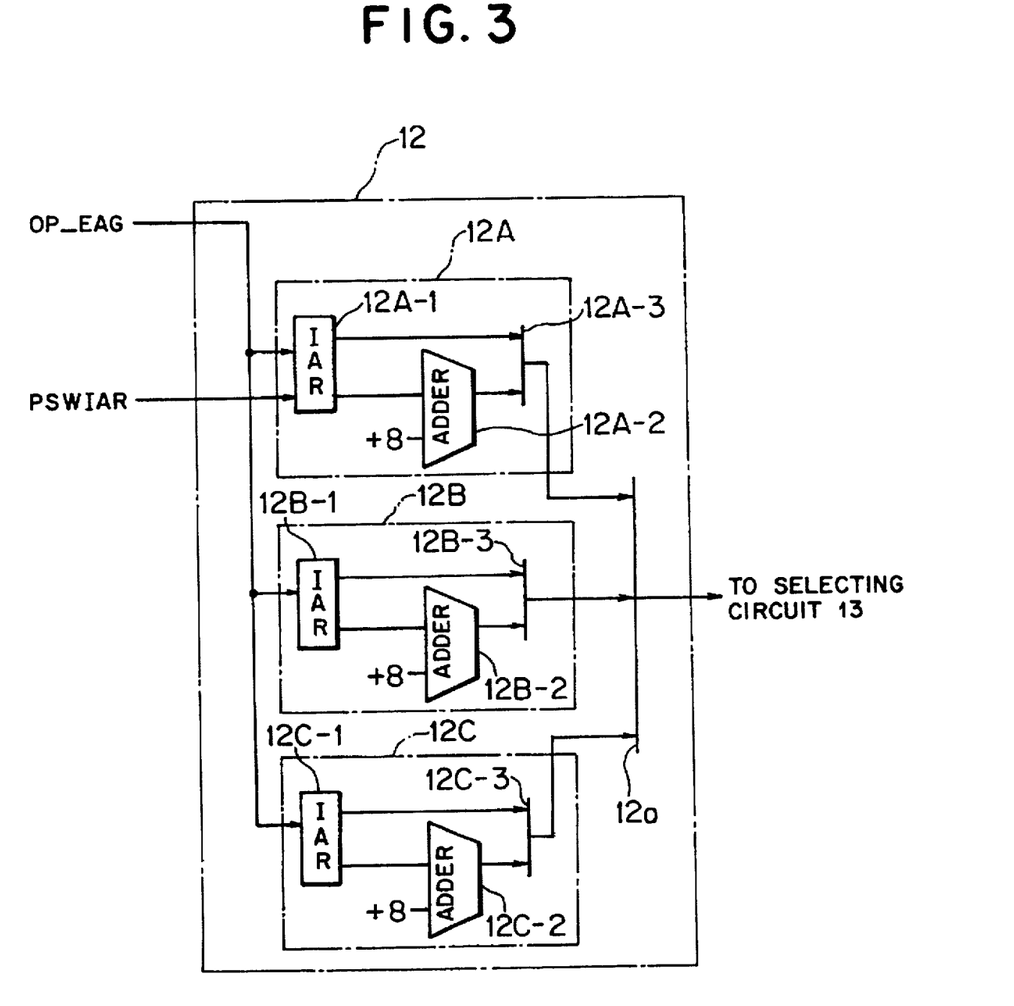
FIG. 3 is a block diagram showing the configuration of an instruction address generating circuit according to the present embodiment.

The instruction address generating circuit (IF_EAG) 12 generates an instruction address on the basis of the address input from the selecting circuit 11. As shown in FIG. 3, the instruction address generating circuit 12 comprises instruction address generating sections 12A, 12B, and 12C for use with three instruction sequences (e.g., a sequence A, a sequence B, and a sequence C), and a selecting circuit 12a which selects one of instruction addresses output from these instruction address generating sections 12A, 12B, and 12C and outputs the thus selected instruction address to a selecting circuit 13. These sequences A to C are identified from each other by two-bit IDs (identifiers) "00", "01", and "10".

These instruction address generating sections 12A, 12B, and 12C are composed of instruction address registers (IAR) 12A-1, 12B-1, and 12C-1, adders 12A-2, 12B-2, and 12C-2, and selecting circuits 12A-3, 12B-3, and 12C-3, respectively.

The address which is indicated by a program status word (PSW) when the pipeline is brought into an operating state is input to the instruction address register 12A-1 for the sequence A from a register PSWIAR (Program Status Word Instruction Register). The instruction address is input to the instruction address register 12A-1 from the selecting circuit 11 during the pipeline processing operation.

For example, when a branch instruction J1 is included in the instructions of the sequence A and a branch instruction J2 is further included in an instruction sequence which is continuous with an instruction at a target branch address obtained when branch conditions of the branch instruction J1 are satisfied, the address of the branch instruction J2 is input to the instruction address register 12B-1 for the sequence B from the selecting circuit 11.

The address register 12C-1 for the sequence C is a backup address register. This address register is usually in an unoccupied (i.e., unused) condition, in preparation for fetching an instruction from the address generated by the operand address generating circuit 21.

The adders 12A-2, 12B-2, and 12C-2 respectively generate a new instruction address for use in fetching an instruction of each sequence by adding a read instruction length (for example, 8 bytes) to the address fed back by the selecting circuits 12a and 13.

The selecting circuits 12A-3, 12B-3, 12C-3 select any one of the addresses held in the instruction address registers 12A-1, 12B-1, 12C-1 and the addresses generated by the adders 12A-2, 12B-2, 12C-2, and outputs the thus selected addresses to the selecting circuit 12a.

On the other hand, the selecting circuit 13 selects any one of the instruction address generated by the instruction address generating circuit 12, the target instruction address OP_EAG generated by the operand address generating circuit 21, and a target instruction address TIA output from the target instruction address hold circuit 20. The selecting circuit 13 outputs the thus selected address to the instruction fetch pipeline cache memory 14, the selecting circuit 11, and the selecting circuit 15.

The instruction address output from the instruction address generating circuit 12 is delivered to the cache memory 14 by means of the selecting circuit 13, whereby the instruction fetch is executed. Further, the instruction address output from the instruction address generating circuit 12 is fed back to the instruction address generating circuit 12 via the selecting circuit 11 by the selecting circuit 13, whereby addresses for instruction fetch purposes are generated in consequence.

The instruction fetch pipeline cache memory 14 is retrieved by the instruction fetch pipeline and is connected to the main storage device (not shown). When the instruction address is input to the cache memory 14 from the selecting circuit 13, an instruction word corresponding to the instruction address is retrieved and output. If it is impossible to retrieve any instruction word corresponding to the instruction address (i.e., if such an instruction word is not hit, in other words, in the case of a miss), an instruction word corresponding to the instruction address is read from the main storage device.

The selecting circuit 15 selects either the instruction address output from the selecting circuit 13 or the target instruction address OP_EAG generated by the operand address generating circuit 21. The thus selected address is output to the branch history address register 16. If the instruction address output from the selecting circuit 13 is a branch instruction, the selecting circuit 15 selects the instruction address output from the selecting circuit 13. The thus selected instruction address is stored in the address register 16. On the other hand, if the target instruction address OP_EAG output from the operand address generating circuit 21 is a branch instruction, the selecting circuit 15 selects the target instruction address OP_EAG output from the operand address generating circuit 21. The thus selected target instruction address OP_EAG is stored in the address register 16.

The branch history 17 manages upper bits of the address of the branch instruction (WIAR), the address (WOAR, TIAR) of the target instruction determined when branching conditions of the branch instruction are satisfied, a decision (VALID) as to whether or not the branch conditions are satisfied, and the information as to whether or not the reading of a predicted target instruction is inhibited (GIDDY).

Such a branch history 17 comprises an instruction address retaining section (IAR) 17a, a target instruction address retaining section (TIAR) 17b, a VALID bit 17c, and a GIDDY bit (the instruction read inhibit bit) 17d. The lower bits of the instruction address (WIAR) of the branch instruction stored in the address register 16 is used as a look up address.

The upper bits of the address (WIAR) of the branch instruction and the address (WOAR, TIAR) of the target instruction determined when the branch conditions of the branch instruction are satisfied are registered in pair in the instruction address retaining section 17a and the target instruction address retaining section 17b, respectively. If branch conditions are satisfied with respect to the pair of addresses provided with the bit 17c, "one" is set and registered in the VALID bit 17c. If the reading of a target instruction predicted from the pair of addresses provided with the bit 17d is inhibited, "one" is set and registered in the GIDDY bit 17d by the GIDDY bit setting circuit 23 in the same manner as previously described.

The upper bits of the address of the branch instruction registered in the branch history 17 is designated by IAR, and the WOAR registered in the branch history 17 is denoted by TIAR in FIG. 2. The registration of each data into the branch history 17 is executed in the cycle W of the instruction execution pipeline.

When the instruction address output from the selecting circuit 15 is set in the address register 16 as the retrieve address of the branch history 17, the branch history 17 is looked up. If the target instruction address is already registered (i.e., a hit) at the corresponding address, the branch history 17 outputs the upper bits of the branch instruction address (IAR), the target instruction address (TIAR), the VALID bit, and the GIDDY bit registered at the retrieved address.

The comparator 18 compares the upper bits of the branch instruction address (IAR) output from the branch history 17 in the above-described manner with the upper bits of the branch instruction address set in the address register 16. If they agree with each other, "one" is output.

The AND gate 19 outputs the logical product of the VALID bit output from the branch history 17 in the above-described manner and the signal output from the comparator 18. Therefore, if both the VALID bit and the signal output from the comparator 18 are "one", in other words, if there is a match as a result of the comparison carried out by the comparator 18, and the branch conditions of the pair of addresses registered in the retrieve address are satisfied, a HIT signal ("one") showing that data are hit as a result of the retrieval of the branch history 17 is output from the AND gate 19.

Figure 4:
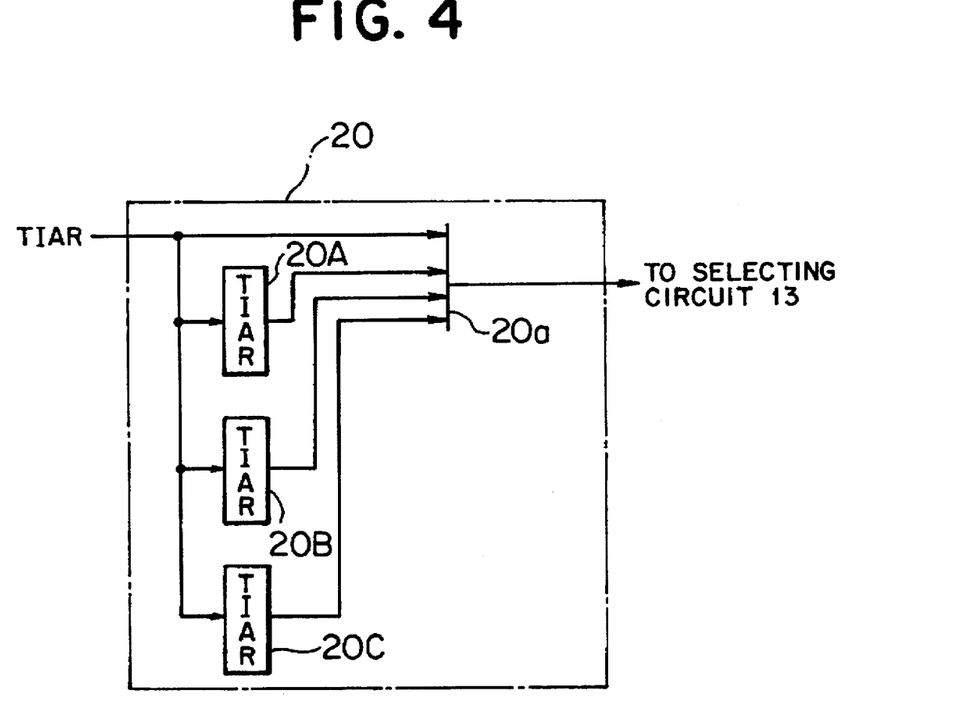
FIG. 4 is a block diagram showing the configuration of a target address hold circuit according to the present embodiment.

The target instruction address hold circuit 20 comprises target instruction address registers 20A, 20B, and 20C for the three sequences, i.e., the sequence A (ID=00), the sequence B (ID=01), and the sequence C (ID=10). Further, the target instruction address hold circuit 20 comprises a selecting circuit 20a which selects one of target instruction addresses (TIAR) output from the target instruction address registers 20A to 20C and the target instruction address (TIAR) output from the branch history 17.

The target instruction address (TIAR) output from the branch history 17 in the above-described manner is immediately used in instruction fetch in the cycle IB or is used in instruction fetch after having been once retained by any one of the target instruction address registers 20A to 20C of the target instruction address hold circuit 20. In the former case, the selecting circuit 20a selects the target instruction address output from the branch history 17, and the thus selected target instruction address is directly delivered from the branch history 17 to the selecting circuit 13.

In the embodiment, the instruction fetch is carried out using the three sequences. However, one of the three sequences is occupied by the fetching of an instruction to be executed in the instruction execution pipeline. Further, one sequence is reserved for use as a backup, in preparation for the case where the instruction branch which was not obtained as a result of retrieval of the branch history 17 is executed in the instruction execution pipeline, and instruction fetch is executed with respect to the target instruction address output from the operand address generating circuit 21. Therefore, reading out of a target instruction on the basis of the result of retrieval (target address) of the branch history 17 is carried out using only one of the three sequences.

Even if the target instruction address is hit and obtained from retrieval of the branch history 17, there is a possibility that the target instruction address cannot be used immediately in reading an instruction in the cycle IB because of the following various reasons. That is, the reading of the target instruction is already carried out in one of the target instruction reading sequences on the basis of the target instruction address output from the branch history 17, or any preceding instruction is not hit in the cache memory 14 although an instruction fetch request is output from the branch history 17.

Figure 6A:
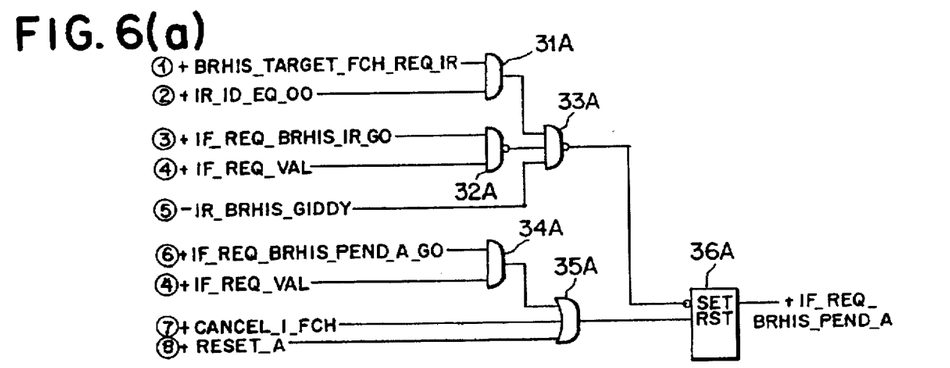
FIGS. 6(a), 6(b) and 6(c) are schematic diagrams respectively showing a logic circuit which generates signals for inhibiting (suspending) the reading a predicted target instruction in the present embodiment.
Figure 6B:
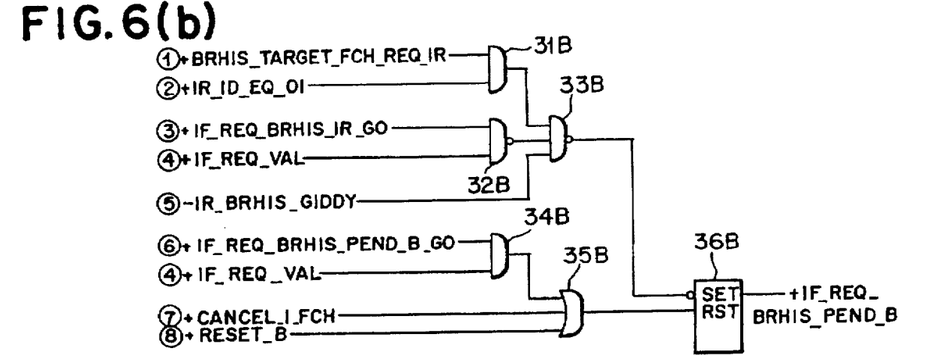
Figure 6C:
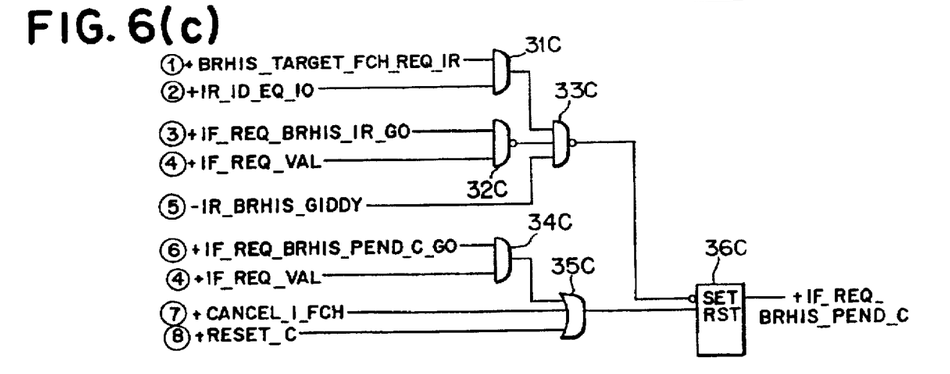

To prevent such problems, the target instruction address (TIAR: a retrieval result) output from the branch history 17 is retained in the target instruction address registers 20A to 20C of the target instruction address hold circuit 20 while a pending signal "IF_REQ_BRHIS_PEND_A/B/C", which is generated by circuits which will be described later with reference to FIGS. 6(a) to 6(c), is set to the ON state ("one"). As a result, that target instruction address is prevented from being immediately used in reading an instruction in the cycle IB even if the above-described problems arise.

At this time, an address register to which the target instruction address is stored is selected from the address registers 20A to 20C by the ID of the instruction fetch that is hit in the branch history 17. In other words, when ID=00, the target instruction address is stored in the address register 20A. When ID=01, the target instruction address is stored in the address register 20B. When ID=10, the target instruction register is stored in the address register 20C. The detailed operation of the target instruction address hold circuit 20 is disclosed in Japanese Patent Application Laid-Open No. 7-152562.

The logic circuit that Generates the previously described pending signal "IF_REQ_BRHIS_PEND_A/B/C" will now be described with reference to FIGS. 6(a) to 6(c). FIGS. 6(a) to 6(c) show circuits for use with the sequences A, B, and C, respectively. A logic circuit for use with the sequence A comprises AND gates 31A and 34A, NAND gates 32A and 33A, an OR gate 35A, and a latch 36A. A logic circuit for use with the sequence B comprises AND Gates 31B and 34B, NAND gates 32B and 33B, an OR Gate 35B, and a latch 36B. A logic circuit for use with the sequence C comprises AND gates 31C and 34C, NAND gates 32C and 33c, an OR gate 35C, and a latch 36C. All of these circuits have the identical circuit configuration, and hence an explanation will be given of only the logic circuit for use with the sequence A, referring to FIG. 6(a).

The AND Gate 31A outputs the logical product of "+BRHIS_TARGET_FCH_REQ_IR" and "+IR_ID_EQ_00". The NAND gate 32A outputs the negated logical product of "+IF_REQ_BRHIS_IR_GO" and "+IF_REQ_VAL". The NAND Gate 33A outputs the negated logical product of the output from the AND Gate 31A, the output from the NAND Gate 32A, and "–IR_BRHIS_GIDDY".

The AND gate 34A outputs the logical product of "+IF_REQ_BRHIS_PEND_A_GO" and "+IF_REQ_VAL". The OR gate 35A outputs the logical sum of the output from the AND gate 34A, "+CANCEL_I_FCH", and "+RESET_A".

The output from the NAND gate 33A is input to a set terminal SET of the latch 36A, and the output from the OR gate 35A is input to a reset terminal RST of the latch 36A. When the output from the NAND gate 33A becomes "one", "+IF_REQ_BRHIS_PEND_A" is set. On the other hand, if the output from the OR gate 35A becomes "one", "+IF_REQ_BRHIS_PEND_A" is reset.

Signals ① to ⑧ input to the previously described logic circuits will now be described.

① "+BRHIS_TARGET_FCH_REQ_IR" is a signal which becomes "one" when a target fetch request from the branch history 17 exists in the cycle IR.

② "+IR_ID_EQ_00" is a signal which becomes "one" (on) when the ID of the IR cycle is "00", i.e., the sequence A is selected.

③ "+IF_REQ_BRHIS_IR_GO" is a signal which becomes "one" (on) when an instruction fetch request is made as a result of the retrieval of the branch history 17.

④ "+IF_REQ_VAL" is a signal which becomes "one" (on) when the instruction fetch request is valid.

⑤ "−IR_BRHIS_GIDDY" is a signal which becomes "one" (on) when the GIDDY bit 17d of the target instruction address obtained as a result of the retrieval of the branch history 17 is in the OFF state ("zero").

⑥ "+IF_REQ_BRHIS_PEND_A_GO" is a signal which is generated by a circuit, which will be described later with reference to FIG. 7(a) and becomes "one" (on) when a suspended request from the branch history 17 is executed.

⑦ "+CANCEL_I_FCH" and ⑧ "+RESET_A" are signals which becomes "one" (on) when the instruction fetch is canceled. These signals ⑦ and ⑧ are used if the sequence for which instruction fetch is carried out is canceled as a result of determination of a preceding branch before the causes, because of which the instruction fetch is not immediately carried out using the target instruction address, are solved.

If the result of ((① AND ②) AND (③ NAND ④) AND ⑤) operated by the logic circuit shown in FIG. 6(a) becomes "one", "+IF_REQ_BRHIS_PEND_A" is set. In short, "+IF_REQ_BRHIS_PEND_A" is set in the latch 36A, if the target fetch request output from the branch history 17 with regard to the sequence A is present in the cycle IR, if the instruction fetch request output from the branch history 17 is not valid, and if the GIDDY bit 17d of the retrieval result is in the OFF state ("zero").

If ((⑥ AND ④) OR ⑦ OR ⑧) becomes "one", "+IF_REQ_BRHIS_PEND_A" is reset. In short, the latch 36A is reset if the suspended request output from the branch history 17 is executed, or if the instruction fetch is canceled. As a result, the "+IF_REQ_BRHIS_PEND_A" changes to the OFF state ("zero").

The logic circuit that generates the previously described signal ⑥ "IF_REQ_BRHIS_PEND_A_GO" will now be described with reference to FIG. 7(a). FIGS. 7(a) to 7(c) show circuits for use with the sequences A, B, and C, respectively. A logic circuit for use with the sequence A comprises AND gates 37A and 38A, and an OR gate 39A. A logic circuit for use with the sequence B comprises AND gates 37B and 38B, and an OR gate 39B. A logic circuit for use with the sequence C comprises AND gates 37C and 38C, and an OR gate 39C. These circuits have the identical circuit configuration, and hence an explanation will be given of only the logic circuit for use with the sequence A with reference to FIG. 7(a).

The AND gate 37A outputs the logical product of the signal ① "+BRHIS_TARGET_FCH_REQ_IR" and the signal ⑤ "−IR_BRHIS_GIDDY". The AND gate 38A outputs the logical product of "+IF_REQ_BRHIS_PEND_A" and a signal ⑨ "+CURRENT_ID_A". The signal ⑨ "+CURRENT_ID_A" is a signal which becomes "one" (on) when the sequence A is selected as one a result of the current instruction fetch.

The OR gate 39 outputs the logical sum of the output from the AND gate 37A and the output from the AND gate 38A, as the signal ⑥ "+IF_REQ_BRHIS_PEND_A_GO".

Figure 7A:
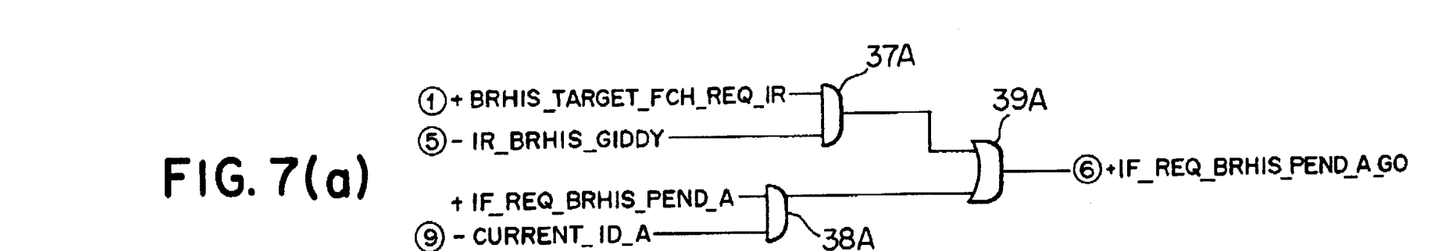
FIGS. 7(a), 7(b) and 7(c) are schematic diagrams respectively showing a logic circuit which generates signals for executing the suspended reading of the predicted target instruction in the present embodiment.
Figure 7B:
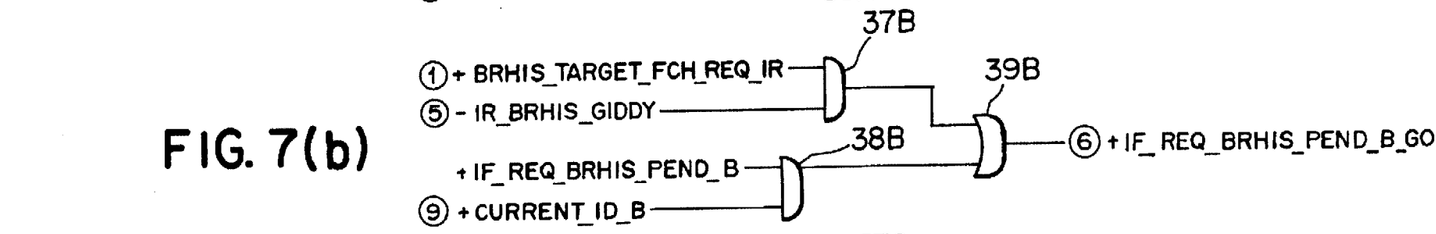
Figure 7C:
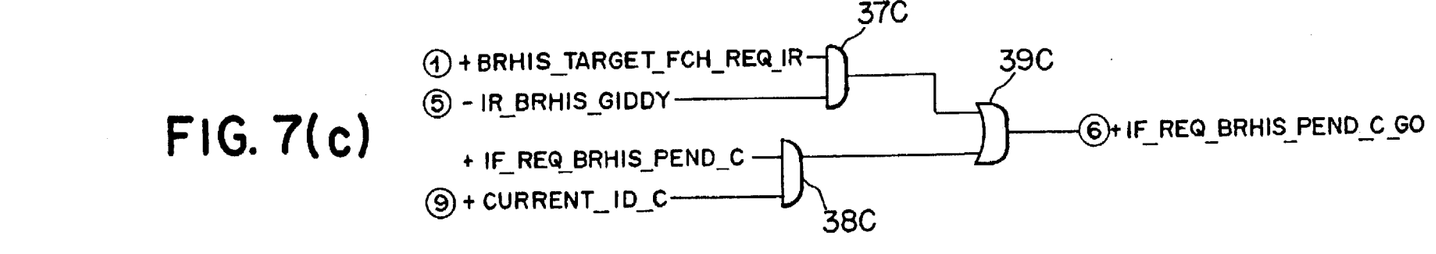

The logic circuit shown in FIG. 7(a) sets the signal ⑥ "+IF_REQ_BRHIS_PEND_A_GO" if the target fetch request output from the branch history 17 is present in the cycle IR and the GIDDY bit 17d of the target fetch request is in the OFF state ("zero"), or if the "+IF_REQ_BRHIS_PEND_A" is in the ON state and the sequence is selected as a result of the current instruction fetch. As a result, the suspended instruction fetch request output from the branch history 17 is executed.

The logic circuits for use with the sequences B and C respectively shown in FIGS. 6(b) and 7(b) and FIGS. 6(c) and 7(c) are also configured in completely the same manner as the logic circuits for use with the sequence A shown in FIGS. 6(a) and 7(a). Therefore, the logic circuits for use with the sequences B and C operate in completely the same manner as previously described.

In the present embodiment, the state of the GIDDY bit 17d which is read when the branch history 17 is retrieved is input as the signal ⑤ "−IR_BRHIS_GIDDY" to the NAND gates 33A to 33C shown in FIGS. 6(a) to 6(c) and the AND gates 37A to 37C shown in FIGS. 7(a) to 7(c). As a result, the instruction read inhibit means previously described with reference to FIG. 1 is implemented.

In short, in the present embodiment, the signal ⑤ "−IR_BRHIS_GIDDY" changes to the OFF state, and hence the logic circuit shown in FIGS. 6(a) to 6(c) inhibit the setting of the signal "IF_REQ_BRHIS_PEND_A/B/C". As a result, the target instruction address output from the branch history 17 is inhibited from being retained in each of the branch address registers 20A to 20C of the target branch address hold circuit 20. At this time, the selecting circuit 20a suspends the execution of a selecting operations, as a result of which the target instruction address output from the branch history 17 is not directly delivered to the selecting circuit 13.

Even when the target fetch request is already output from the branch history 17 and that target fetch request is retained in each of the branch address registers 20A to 20C, the signal ⑤ "−IR_BRHIS_GIDDY" changes to the OFF state if the GIDDY bit 17d is in the ON state. The logic circuits shown in FIGS. 7(a) to 7(c) inhibit the setting of the signal ⑥ "IF_REQ_BRHIS_PEND_A_GO" (i.e., the issue of the instruction fetch request from the branch history 17).

Therefore, the instruction fetch request from the branch history 17 is suspended, and an instruction fetch request is executed using the address Generated from the operand address.

The information processing apparatus 10 of the present embodiment is provided with means for retaining the registered pair of addresses (IAR and TIAR) Just as they are when the GIDDY bit 17d of the target instruction address obtained as a result of the retrieval of the branch history 17 is in the ON state. This retaining means prevents the branch instruction address and a new target instruction address from being registered in the branch history 17.

With the above-described configuration of the information processing apparatus 10 of the present embodiment, if the instruction to be executed is a branch instruction, the instruction addresses output from the instruction address generating circuit 12, the operand address generating circuit 21, and the target instruction address hold circuit 20 are stored in the branch history address register 16 via the selecting circuits 13 and 15 prior to the execution of the branch instruction.

When the branch instruction address is stored in the address register 16, the branch history 17 is retrieved in the same manner as previously described. If a target instruction address which pairs off with the branch instruction address is registered in the branch history (i.e., if such a target instruction address is hit), an instruction corresponding to the target instruction address is read as a predicted target instruction. This predicted target instruction is introduced into the instruction execution pipeline in the cycle IR before the execution of the original branch instruction is completed.

As described above, when the branch instruction is executed, the pair of addresses (the branch instruction address and the target instruction address) already registered in the branch history 17 are obtained. Instruction fetch is carried out with respect to that target instruction address, and the thus read instruction is introduced into the instruction execution pipeline and is, then, executed. Now, it is assumed that the address of the target instruction related to the branch instruction is changed at that time.

In such a case, the target instruction address read from the branch history 17 which is to be used for instruction fetch is wrong. Therefore, it becomes necessary to read a correct instruction from the cache memory 14 (or the main storage device) again after the execution of a predicted target instruction has been canceled as a result of detection of the error in the cycle C, as in the example described with reference to FIG. 9.

In the present embodiment, if the above-described problem arises, that information is registered in the branch history 17 by setting the GIDDY bit 17d attached to the corresponding pair of addresses to the ON state.

The branch history 17 is retrieved prior to the execution of the branch instruction. If the pair of addresses are hit, the GIDDY bit attached to the pair of addresses is read. The thus read GIDDY bit is notified to the instruction fetch pipeline as a tag.

In this event, if the GIDDY bit is in the ON state ("one"), the signals generated by the logic circuits shown in FIGS. 6(a) to 6(c) and FIGS. 7(a) to 7(c) prevent the fetching of an instruction from the target instruction address. An instruction is read from the address of a correct target instruction according to ordinary procedures without use of the branch history 17. In short, the reading of an instruction is carried out using the address of a correct target instruction generated from the operand address. Accordingly, even if the address of the target instruction is changed every time the same branch instruction appears, it becomes possible to execute the branch instruction without wasting time.

In that case, the previously described retaining means inhibits the registration of the address of the branch instruction and the address of a new target instruction into the branch history 17. Therefore, if the branch history 17 is retrieved again, it becomes possible to utilize the information (i.e., the pair of addresses) that is registered in the branch history 17 when the GIDDY bit is set to the ON state, by switching the GIDDY bit from the ON state to the OFF state. Even if the address of the target instruction is changed every time the same branch instruction appears, it becomes possible to effectively utilize the branch history 17.

Figure 8:
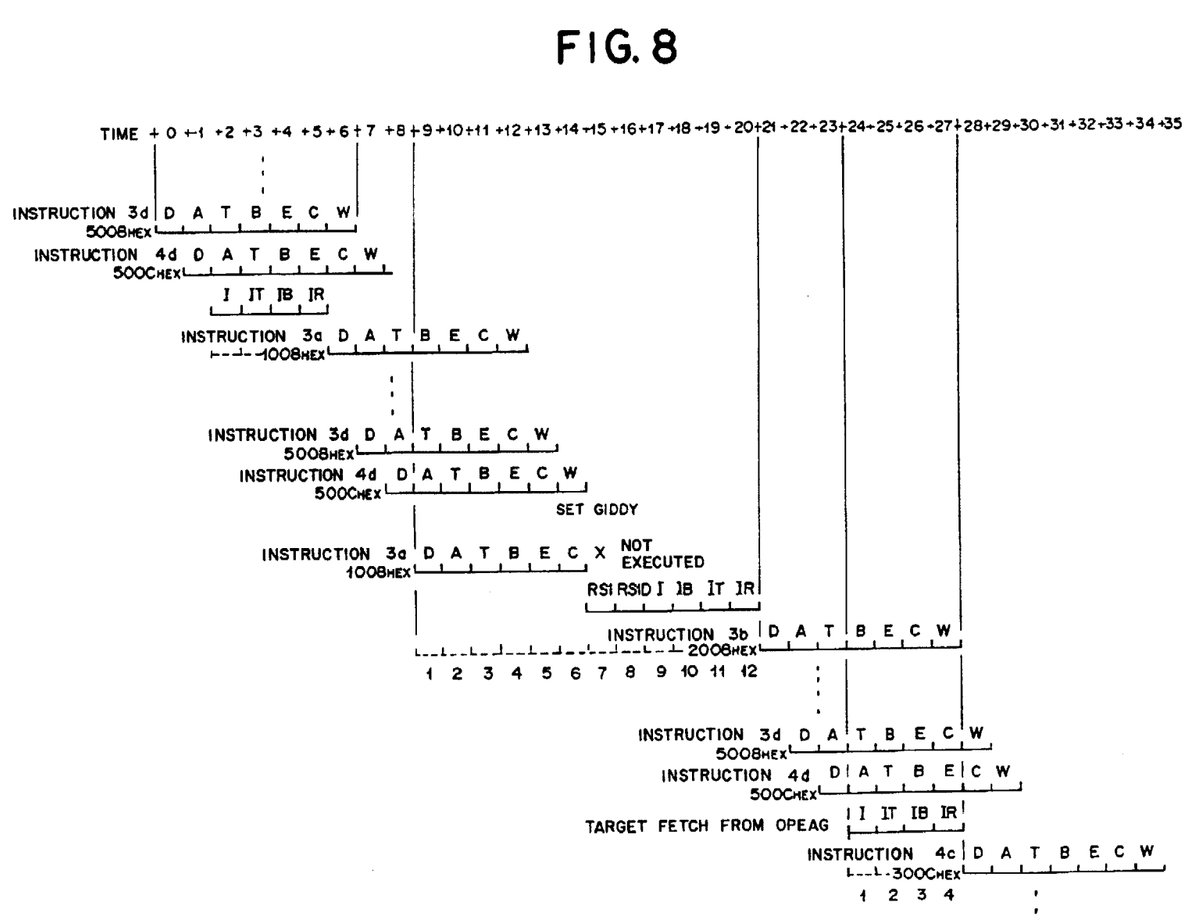
FIG. 8 is a timing chart for illustrating pipeline processing carried out by the information processing apparatus according to the present embodiment.

The processing required when the information processing apparatus 10 of the present embodiment executes the instruction sequence as previously described in FIG. 9 will be described with reference to FIG. 8.

[1] If a branch takes place as a result of execution of a branch instruction (an instruction 4d) of the subroutine for the first time, the address of the instruction 4d ($500C_{HEX}$), the address of a target instruction (an instruction 3a) ($1008_{HEX}$), and the VALID bit are registered in the branch history 17.

[2] If a branch takes place by the execution of the instruction 4d again as a result of the continuous execution of the instruction sequence, the address of the instruction 3a ($1008_{HEX}$) is obtained by retrieving the branch history 17. Then, a target is fetched from the branch history 17. It becomes possible to introduce the instruction 3a into the instruction fetch pipeline without wasting time.

In practice, the target instruction associated with the instruction 4d that appeared second time is changed from the instruction 3a to an instruction 3b. Therefore, it turns out that the instruction 3a is wrong only after the processing has reached the cycle C. In consequence, the target instruction address ($1008_{HEX}$) hit and read becomes invalid, and the instruction 3a is canceled halfway. An instruction is fetched again using the address of the correct instruction 3b ($2008_{HEX}$).

In this case, the GIDDY bit setting circuit 23 of the present embodiment sets the GIDDY bit 17d of the instruction 4d to the ON state. Further, the pair of addresses [the address of the branch instruction 4d ($500C_{HEX}$) and the address of the target instruction 3b ($2008_{HEX}$)] obtained as a result the execution of the instruction carried out this time are registered in the branch instruction address retaining section 17a and the target instruction address retaining section 17b of the branch history 17.

[3] Thereafter, the instruction sequence continues to be executed. If the instruction 4d appears again, the branch history 17 is looked up, and the GIDDY bit 17d relating to the instruction 4d registered in the branch history 17 is read. The GIDDY bit is set to the ON state, and hence the instruction fetch on the basis the target instruction address obtained as a result of the retrieval of the branch history 17 is inhibited.

In the instruction execution pipeline, the instruction fetch is executed using an instruction address ($300C_{HEX}$) of the correct target instruction (the instruction 4c) generated by the operand address generating circuit 21 in the cycle A. In this event, the pair of addresses obtained when the GIDDY bit 17d is set to the ON state is retained in the branch instruction address retaining section 17a and the target instruction address retaining section 17b of the branch history 17. Consequently, the address of the branch instruction 4d ($500C_{HEX}$) and the address of the target instruction 4c ($300C_{HEX}$) are prevented from being registered in pair in the branch history.

In an information processing apparatus which is not provided with the feature disclosed in the present embodiment, a new pair of branch instruction address and target instruction address are registered in the branch history 17 again every time the target instruction address of the branch instruction is changed. A canceling operation is carried out every time the same branch instruction appears, as shown in FIG. 9. As a result, time loss of 12 is produced when instruction fetch is carried out using a correct target instruction address.

Contrary to this, in the information processing apparatus 10 of the present embodiment, the GIDDY bit is set to the ON state at the time when the same branch instruction appears twice, if the address of the target instruction is changed every time the same branch instruction appears. If the same branch instruction appears equal to or more than three times, an ordinary target fetch output from the operand address generating circuit 21 is executed, which reduces loss time to 4τ.

In this way, according to the embodiment of the present invention, even if the address of the target instruction is changed every time the same branch instruction appears, it becomes possible to execute that branch instruction without wasting time. It is also possible to effectively utilize the branch history 17, which in turn results in high-speed processing of the branch instruction and makes it possible to improve the performance of the information processing apparatus 10 to a much greater extent.

Although the information processing apparatus capable of processing instructions of the three sequences has been described in the preceding embodiment, the present invention is not limited thereto.

What is claimed is:

1. An information processing apparatus of a pipeline processing type, which has a branch history in which the address of a branch instruction and the address of a target instruction at the time when branching conditions of the branch instruction are satisfied are registered in pair, and in which said branch history is looked up on the basis of the address of the branch instruction prior to execution of the branch instruction, and if the address of the target instruction which pairs off with the address of the current branch instruction is registered in the branch history, an instruction corresponding to the address of the target instruction is read as a predicted target instruction so as to introduced the predicted target instruction into an instruction execution pipeline, wherein an instruction read inhibit bit is provided for each pair of addresses registered in the branch history, and an instruction read inhibit bit setting section is provided, said instruction read inhibit bit being set to an ON state when the reading of the predicted target instruction based on the pair of addresses is inhibited, and said instruction read inhibit bit setting section setting the instruction read inhibit bit of the pair of addresses in the branch history to the ON state, in a case where it is found, when the predicted target instruction is read according to the pair of addresses already registered in the branch history to execute the branch instruction and the thus read target instruction is executed, that the predicted target instruction differs from an actual target instruction, and therefore the execution of the predicted target instruction is canceled and the actual target instruction is read again.

2. The information processing apparatus according to claim 1, wherein instruction read inhibit section is provided so as to inhibit the reading of the predicted target instruction obtained from the pair of addresses, when the instruction read inhibit bit of the registered pair of addressees, which is obtained by looking up said branch history to execute the branch instruction, is in the ON state.

3. The information processing apparatus according to claim 2, wherein hold section is provided so as to hold the registered pair of addresses as they are, when the instruction read inhibit bit of the registered pair of addressees, which is obtained by looking up said branch history to execute the branch instruction, is in the ON state.

4. The information processing apparatus according to claim 1, wherein hold section is provided so as to hold the registered pair of addresses as they are, when the instruction read inhibit bit of the registered pair of addressees, which is obtained by looking up said branch history to execute the branch instruction, is in the ON state.

* * * * *